(12) United States Patent  (10) Patent No.: US 8,110,316 B2
Oda et al.  (45) Date of Patent: Feb. 7, 2012

(54) FUEL CELL

(75) Inventors: Masaru Oda, Utsunomiya (JP); Takashi Kosaka, Utsunomiya (JP); Norimasa Kawagoe, Utsunomiya (JP); Teruyuki Ohtani, Haga-gun (JP); Narutoshi Sugita, Utsunomiya (JP); Masaaki Sakano, Utsunomiya (JP); Masahiro Mohri, Ustunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 12/126,595

(22) Filed: May 23, 2008

(65) Prior Publication Data

US 2008/0292930 A1  Nov. 27, 2008

(30) Foreign Application Priority Data

May 24, 2007  (JP) .................................. 2007-138037

(51) Int. Cl.
*H01M 8/04* (2006.01)
(52) U.S. Cl. ........................................ 429/483; 429/512
(58) Field of Classification Search .................... 429/12, 429/34, 36, 38, 483, 444, 484, 485, 512
See application file for complete search history.

(56) References Cited

U.S. PATENT DOCUMENTS

| 6,261,710 | B1 | 7/2001 | Marianowski |
| 7,195,837 | B2 | 3/2007 | Suzuki et al. |
| 7,297,432 | B2 * | 11/2007 | Sugita et al. .................. 429/469 |
| 2003/0215695 | A1 | 11/2003 | Suzuki et al. |
| 2006/0204807 | A1 | 9/2006 | Kosaka et al. |
| 2007/0009779 | A1 | 1/2007 | Mohri et al. |
| 2007/0207372 | A1 * | 9/2007 | Kikuchi et al. .................. 429/38 |

FOREIGN PATENT DOCUMENTS

| DE | 10015360 A1 | 10/2001 |
| JP | 2002-530836 A1 | 9/2002 |
| JP | 2003-338300 A2 | 11/2003 |

OTHER PUBLICATIONS

European Office Action for Application No. 08009412.1, dated Aug. 13, 2008.

* cited by examiner

*Primary Examiner* — Cynthia H. Kelly
*Assistant Examiner* — Monique Wills
(74) *Attorney, Agent, or Firm* — Nelson Mullins Riley & Scarborough LLP; Anthony A. Laurentano (57) ABSTRACT

A first metal separator of one of adjacent power generation cells and a second metal separator of the other of the adjacent power generation cells are directly stacked together to form a coolant flow field. The first metal separator has a press line protruding toward the coolant flow field, between a fuel gas flow field and an inlet buffer. The second metal separator has a press line protruding toward the coolant flow field, between an oxygen-containing gas flow field and an inlet buffer. The press lines contact each other to limit flow of the coolant into a back surface buffer.

5 Claims, 8 Drawing Sheets

FUEL CELL

BACKGROUND OF THE INVENTION

1. Field of the Invention

The present invention relates to a fuel cell formed by stacking a membrane electrode assembly and metal separators of corrugated plates in a stacking direction. The membrane electrode assembly includes a pair of electrodes, and an electrolyte interposed between the electrodes. A reactant gas flow field is formed in the fuel cell for supplying a reactant gas along an electrode surface in a direction of gravity or in a horizontal direction. A coolant flow field is formed in the fuel cell for supplying a coolant in a direction intersecting the flow direction of the reactant gas of the reactant gas flow field.

2. Description of the Related Art

For example, a solid polymer electrolyte fuel cell employs a membrane electrode assembly which includes an anode, a cathode, and an electrolyte membrane interposed between the anode and the cathode. The electrolyte membrane is a polymer ion exchange membrane. The membrane electrode assembly is sandwiched between separators to form a power generation cell. In use, a predetermined number of power generation cells are stacked together to form a fuel cell stack. p In the fuel cell, a fuel gas flow field (hereinafter also referred to as the "reactant gas flow field") for supplying a fuel gas along an anode and an oxygen-containing gas flow field (hereinafter also referred to as the "reactant gas flow field") for supplying an oxygen-containing gas along a cathode are formed in surfaces of separators facing the anode and the cathode, respectively. Further, a coolant flow field for supplying a coolant is formed along surfaces of the separators for each of the power generation cells, or for every predetermined number of the power generation cells.

The fuel cell may adopt so called the internal manifold structure in which reactant gas passages and coolant passages extending in the stacking direction of the separators are provided in the fuel cell. In the structure, in general, buffers are provided between the reactant gas passages and the reactant gas flow field for supplying, and dispersing the reactant gas to the reactant gas flow field uniformly.

Figure 8:
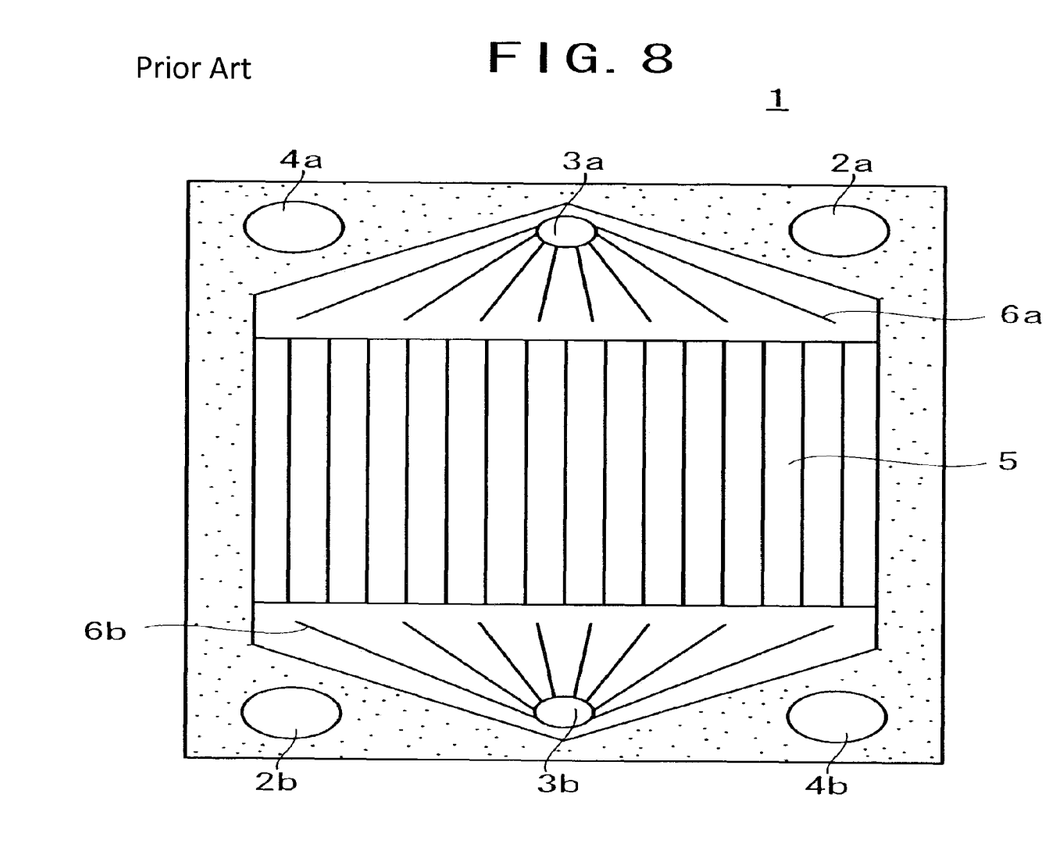
FIG. 8 is a front view showing a sheet metal element disclosed in Japanese Laid-Open Patent Publication No. 2002-530836 (PCT Application).

For example, in Japanese Laid-Open Patent Publication No. 2002-530836 (PCT Application), as shown in FIG. 8, an oxygen-containing gas inlet manifold 2a, a coolant inlet manifold 3a, a fuel gas inlet manifold 4a extend through a sheet metal element 1 at one end in a longitudinal direction. An oxygen-containing gas outlet manifold 2b, a coolant outlet manifold 3b, and a fuel gas outlet manifold 4b extend through the sheet metal element 1 at the other end in the longitudinal direction.

A straight corrugated flow field 5 is formed in a cooling surface of the sheet metal element 1. An inlet buffer 6a and an outlet buffer 6b each including dimples or rails are provided at opposite ends of the corrugated flow field 5. Though not shown, the inlet buffer 6a and the outlet buffer 6b are provided at positions corresponding to inlet buffers and outlet buffers of flow fields for the fuel gas and the oxygen-containing gas. It is because the flow direction of the coolant is the same as the flow directions of the fuel gas and the oxygen-containing gas.

In the conventional technique, the inlet buffer 6a and the outlet buffer 6b are provided on the cooling surface of the sheet metal element 1. The coolant supplied from the coolant inlet manifold 3a flows from the inlet buffer 6a to the corrugated flow field 5, and the coolant is discharged from the corrugated flow field 5 to the coolant outlet manifold 3b through the outlet buffer 6b.

However, in the structure, the coolant flows into the inlet buffer 6a and the outlet buffer 6b where power generation is not performed and cooling is not required. Therefore, the flow rate of the supplied coolant needs to be larger than the flow rate of the coolant which is actually required for cooling the power generation area. Thus, loss of electrical energy in the coolant pump is large, and the system efficiency is low.

SUMMARY OF THE INVENTION

A main object of the present invention is to provide a fuel cell, in particular, having structure in which the flow direction of a coolant intersects the flow directions of reactant gases, entry of the coolant into the back surface of a reactant gas buffer (hereinafter referred to as a "back surface buffer") is reliably prevented, and power generation is carried out efficiently and economically.

The present invention relates to a fuel cell formed by stacking a membrane electrode assembly and metal separators of corrugated plates in a stacking direction. The membrane electrode assembly includes a pair of electrodes, and an electrolyte membrane interposed between the electrodes. A reactant gas flow field is formed in the fuel cell for supplying a reactant gas along an electrode surface, and a coolant flow field is formed in the fuel cell for supplying a coolant in a direction intersecting a flow direction of the reactant gas of the reactant gas flow field.

A reactant gas passage and a coolant passage extend through the metal separators for allowing the reactant gas and the coolant to flow in the stacking direction. Each of the metal separators has a buffer connecting the reactant gas passage and the reactant gas flow field. At least one of the metal separators includes a protrusion protruding toward the coolant flow field between the reactant gas flow field and the buffer, to limit flow of the coolant into a back surface buffer as a back surface of the buffer.

According to the present invention, the flow of the coolant is limited by the protrusions between the coolant passages and the back surface buffer. Therefore, the coolant flows along the coolant flow field reliably and suitably. Thus, it is possible to reduce the required flow rate of the coolant, and loss of electrical energy in the coolant pump is reduced, and improvement in the system efficiency is achieved easily.

Further, the protrusions of the coolant flow field form the grooves in the reactant gas flow field. In the structure, the reactant gas is distributed in the reactant gas flow field uniformly. Therefore, improvement in the power generation performance is achieved advantageously. Further, since the coolant is distributed to the power generation area uniformly, generation of local hot spots does not occur, and the temperature degradation of the electrolyte membrane can be reduced.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
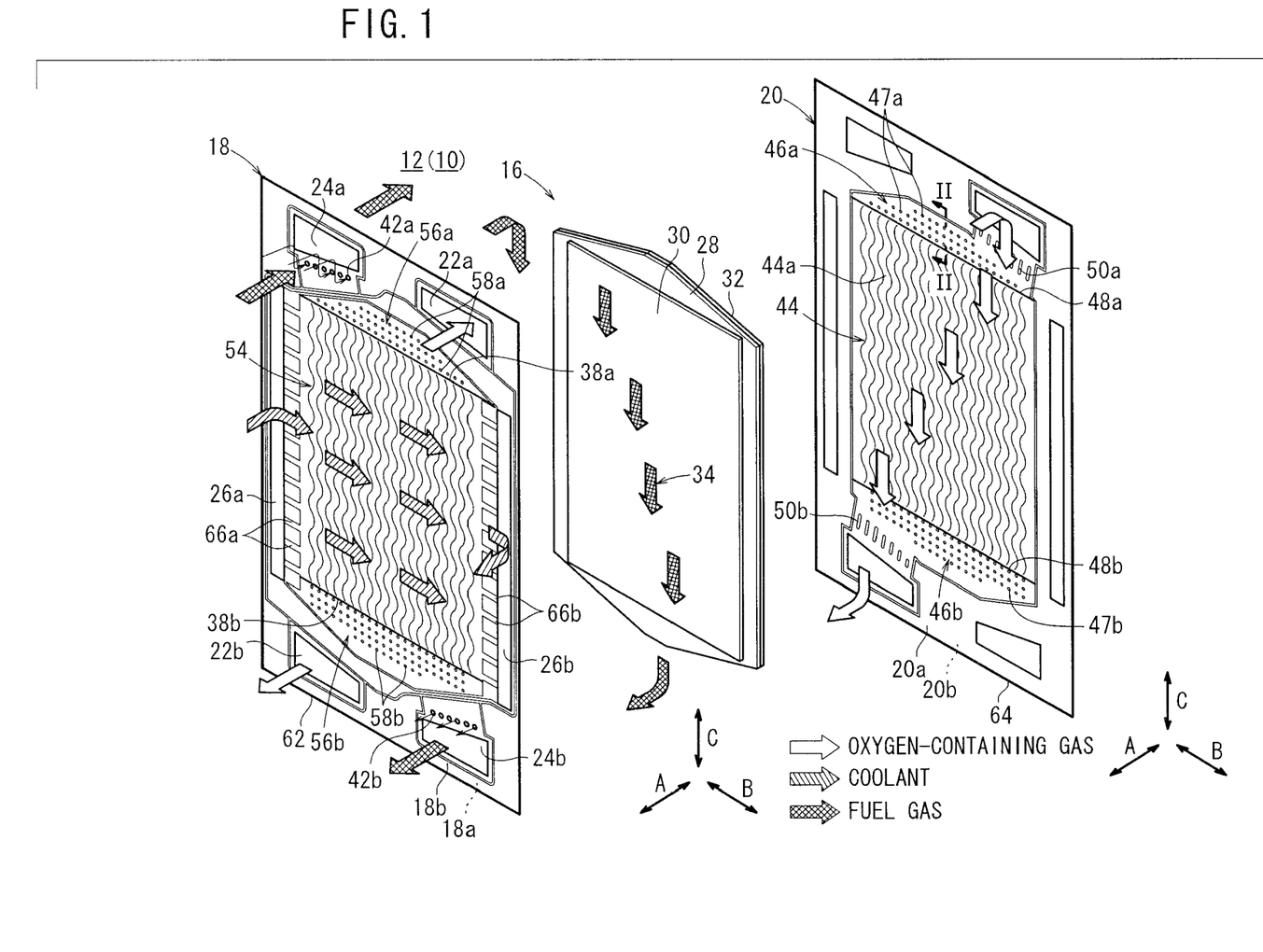
FIG. 1 is an exploded perspective view schematically showing a power generation cell of a fuel cell according to a first embodiment of the present invention.
Figure 2:
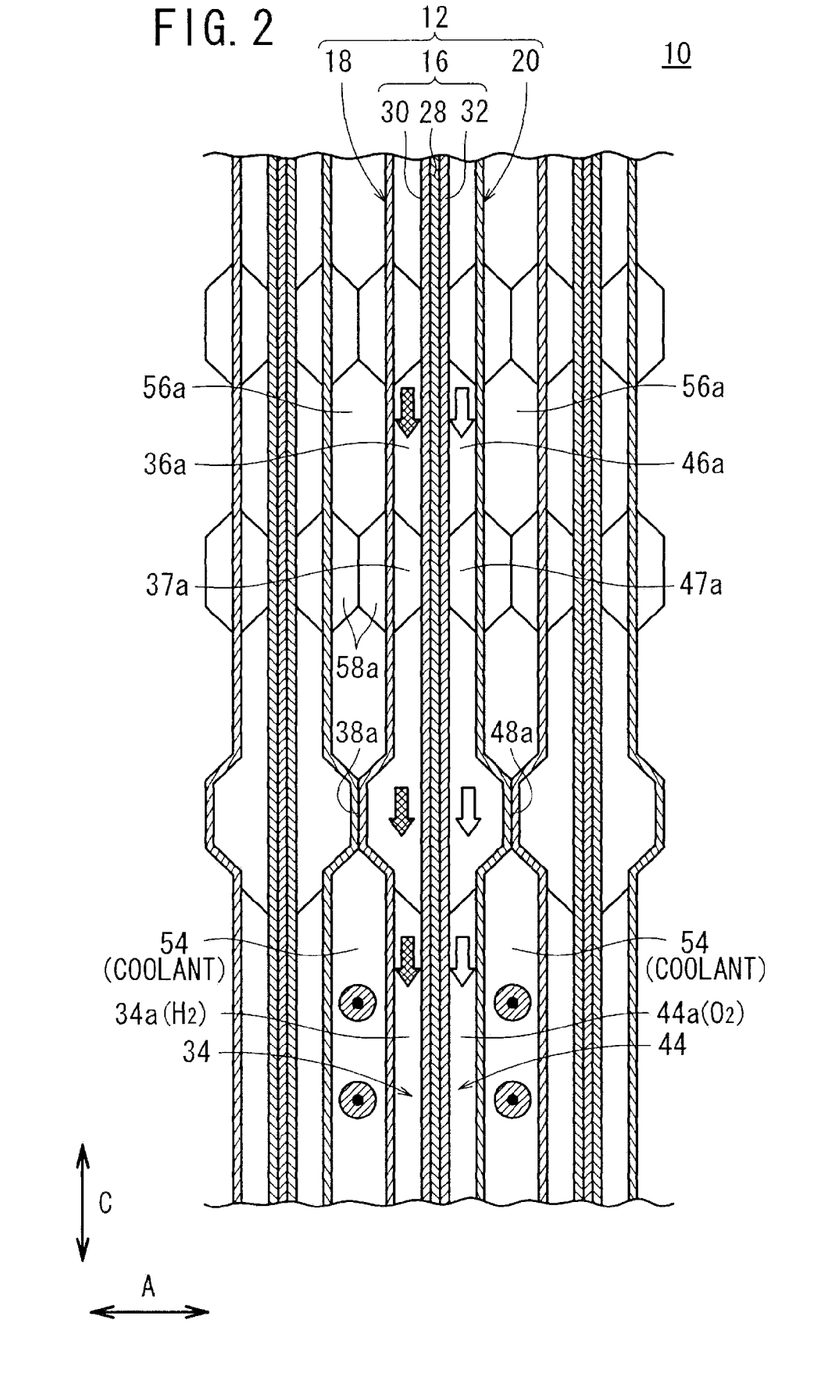
FIG. 2 is a cross sectional view taken along a line II-II in FIG. 1, showing the fuel cell.

As shown in FIGS. 1 and 2, a fuel cell 10 according to a first embodiment of the present invention is formed by stacking a plurality of power generation cells 12 in a direction indicated by an arrow A. At opposite ends of the fuel cell 10 in the stacking direction, end plates (not shown) are provided. The stacked power generation cells 12 between the end plates are fixed together by tie rods (not shown). Alternatively, the power generation cells 12 are placed in a casing (not shown), and a predetermined tightening load is applied to the power generation cells 12 in the direction indicated by the arrow A.

Each of the power generation cells 12 includes a membrane electrode assembly 16 and an anode side first metal separator 18 and a cathode side second metal separator 20 sandwiching the membrane electrode assembly 16. The first metal separator 18 and the second metal separator 20 have ridges and grooves in cross section by corrugating metal thin plates under pressure.

For example, the first metal separator 18 and the second metal separator 20 are steel plates, stainless steel plates, aluminum plates, plated steel sheets, or metal plates having anti-corrosive surfaces by surface treatment.

At an upper end of the power generation cell 12 in a longitudinal direction indicated by an arrow C in FIG. 1, an oxygen-containing gas supply passage (reactant gas passage) 22a for supplying an oxygen-containing gas and a fuel gas supply passage (reactant gas passage) 24a for supplying a fuel gas such as a hydrogen-containing gas are provided. The oxygen-containing gas supply passage 22a and the fuel gas supply passage 24a extend through the power generation cell 12 in the direction indicated by the arrow A.

At a lower end of the power generation cell 12 in the longitudinal direction, a fuel gas discharge passage (reactant gas passage) 24b for discharging the fuel gas and an oxygen-containing gas discharge passage (reactant gas passage) 22b for discharging the oxygen-containing gas are provided. The fuel gas discharge passage 24b and the oxygen-containing gas discharge passage 22b extend through the power generation cell 12 in the direction indicated by the arrow A.

At one end of the power generation cell 12 in a lateral direction indicated by an arrow B, a coolant supply passage 26a for supplying a coolant is provided. At the other end of the power generation cell 12 in the lateral direction, a coolant discharge passage 26b for discharging the coolant is provided. The coolant supply passage 26a and the coolant discharge passage 26b extend through the power generation cell 12 in the direction indicated by the arrow A.

The membrane electrode assembly 16 includes an anode 30, a cathode 32, and a solid polymer electrolyte membrane 28 interposed between the anode 30 and the cathode 32. The solid polymer electrolyte membrane 28 is formed by impregnating a thin membrane of perfluorosulfonic acid with water, for example. In the embodiment, the surface area of the anode 30 is smaller than the surface area of the cathode 32.

Each of the anode 30 and the cathode 32 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 30 and the electrode catalyst layer of the cathode 32 are fixed to both surfaces of the solid polymer electrolyte membrane 28, respectively.

Figure 3:
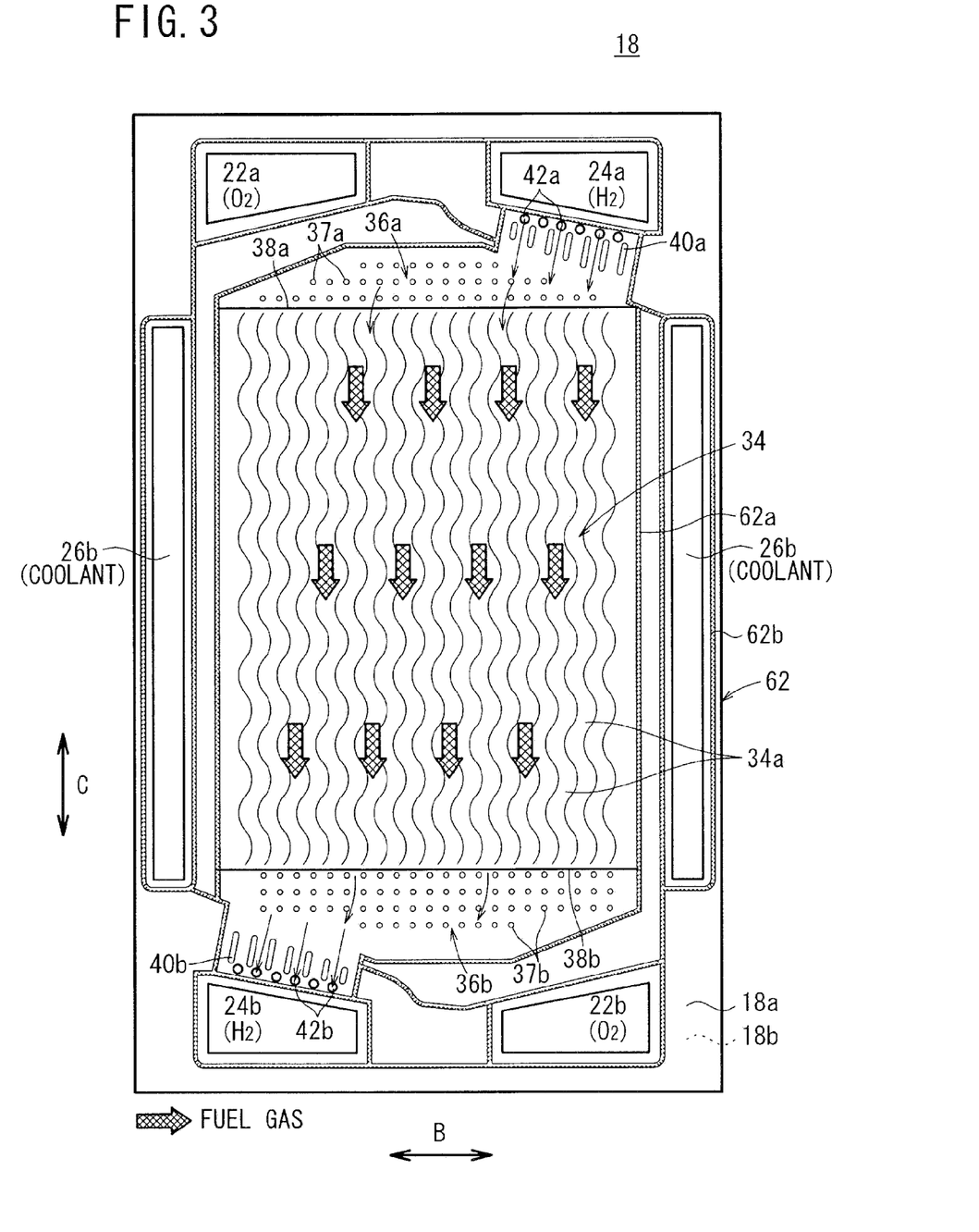
FIG. 3 is a front view showing one surface of a first metal separator of the fuel cell.

As shown in FIG. 3, the first metal separator 18 has a fuel gas flow field 34 on its surface 18a facing the membrane electrode assembly 16. The fuel gas flow field 34 is connected between the fuel gas supply passage 24a and the fuel gas discharge passage 24b. The fuel gas flow field 34 has a plurality of corrugated flow grooves 34a extending in a direction indicated by an arrow C. An inlet buffer 36a and an outlet buffer 36b are provided at upper and lower ends of the corrugated flow grooves 34a in the direction indicated by the arrow C.

The inlet buffer 36a and the outlet buffer 36b include a plurality of bosses 37a, 37b. Each of the inlet buffer 36a and the outlet buffer 36b has a substantially triangular shape with the center in the width direction protruding upwardly and downwardly. Press lines (protrusions) 38a, 38b protruding toward a coolant flow field 54 as described later (toward the surface 18b) are formed by pressure forming, between the fuel gas flow field 34 and the inlet buffer 36a, and between the fuel gas flow field 34 and the outlet buffer 36b, respectively.

A plurality of receivers 40a and a plurality of receivers 40b are provided on the surface 18a of the first metal separator 18. The receivers 40a form a connection channel connecting the fuel gas supply passage 24a and the inlet buffer 36a. The receivers 40b form a connection channel connecting the fuel gas discharge passage 24b and the outlet buffer 36b. A plurality of supply holes 42a and a plurality of discharge holes 42b are provided adjacent to the receivers 40a, 40b, respectively. The supply holes 42a are connected to the fuel gas supply passage 24a on the surface 18b, and likewise, the discharge holes 42b are connected to the fuel gas discharge passage 24b on the surface 18b (see FIG. 4).

As shown in FIG. 1, the second metal separator 20 has an oxygen-containing gas flow field 44 on its surface 20a facing the membrane electrode assembly 16. The oxygen-containing gas flow field 44 is connected between the oxygen-containing gas supply passage 22a and the oxygen-containing gas discharge passage 22b. The oxygen-containing gas flow field 44 has a plurality of corrugated flow grooves 44a extending in a direction indicated by the arrow C. An inlet buffer 46a and an outlet buffer 46b are provided at upper and lower ends of the corrugated flow grooves 44a in the direction indicated by the arrow C.

The inlet buffer 46a and the outlet buffer 46b include a plurality of bosses 47a, 47b. Each of the inlet buffer 46a and the outlet buffer 46b has a substantially triangular shape with the center in the width direction protruding upwardly and downwardly. Press lines (protrusions) 48a, 48b protruding toward a coolant flow field 54 as described later (toward the surface 20b) are formed by pressure forming (see FIG. 2), between the oxygen-containing gas flow field 44 and the inlet buffer 46a, and between the oxygen-containing gas flow field 44 and the outlet buffer 46b, respectively.

A plurality of receivers 50a and a plurality of receivers 50b are provided on the surface 20a of the second metal separator 20. The receivers 50a form a connection channel connecting the oxygen-containing gas supply passage 22a and the inlet buffer 46a, and the receivers 50b form a connection channel connecting the oxygen-containing gas discharge passage 22b and the outlet buffer 46b.

As shown in FIGS. 1 and 2, a coolant flow field 54 is formed between the surface 18b of the first metal separator 18 and the surface 20b of the second metal separator 20. The coolant flow field 54 is connected between the coolant supply passage 26a and the coolant discharge passage 26b. That is, the back surface of the fuel gas flow field 34 and the back surface of the oxygen-containing gas flow field 44 are overlapped with each other to form the coolant flow field 54 extending in the direction indicated by the arrow B. Specifically, the back surface of the corrugated flow grooves 34a and the back surface of the corrugated flow grooves 44a are overlapped with each other to form the coolant flow field 54.

Figure 4:
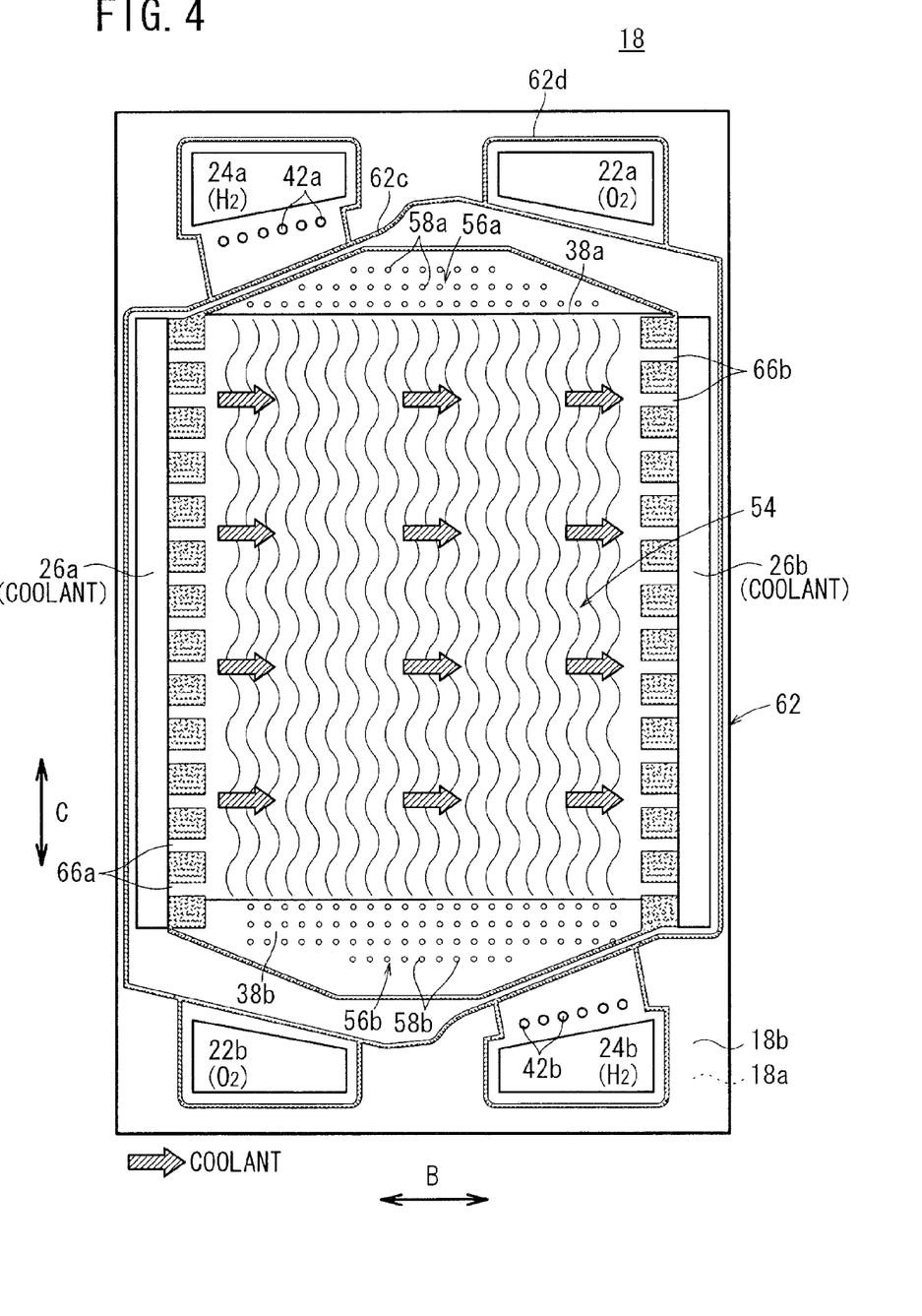
FIG. 4 is a front view showing the other surface of the first metal separator of the fuel cell.

As shown in FIGS. 1 and 4, on the surface 18b of the first metal separator 18, back surface buffers 56a, 56b are provided at upper and lower ends of the coolant flow field 54 in the direction indicated by the arrow C. That is, the back surface buffers 56a, 56b are provided on the back surfaces of the inlet buffer 36a and the outlet buffer 36b, and have substantially triangular shapes, respectively. The shapes of the back surface buffers 56a, 56b correspond to the shapes of the back surfaces of the inlet buffer 36a and the outlet buffer 36b, respectively. A plurality of bosses 58a, 58b are provided in the back surface buffers 56a, 56b. The surface 20b of the second metal separator 20 and the surface 18b of the first metal separator 18 have the same structure, and detailed description thereof will be omitted.

As shown in FIG. 2, the first metal separator 18 of one of the adjacent power generation cells 12 and the second metal separator 20 of the other of the adjacent power generation cells 12 are directly stacked together to form the coolant flow field 54. The press lines 38a, 38b, and the press lines 48b, 48b contact each other to limit the flow of coolant into the back surface buffers 56a, 56b.

A first seal member 62 is provided integrally with the surfaces 18a, 18b of the first metal separator 18, around the outer end of the first metal separator 18. A second seal member 64 as a planar seal is provided integrally with the surfaces 20a, 20b of the second metal separator 20, around the outer end of the second metal separator 20. Each of the first and second seal members 62, 64 is made of seal material, cushion material, or packing material such as an EPDM (ethylene propylene diene monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

As shown in FIG. 3, on the surface 18a, the first seal member 62 includes an inner seal 62a provided around the fuel gas flow field 34 and an outer seal 62b provided outside the inner seal 62a. The inner seal 62a is a ridge seal formed around the fuel gas flow field 34, the inlet buffer 36a, the outlet buffer 36b, the supply holes 42a and the discharge holes 42b.

As shown in FIG. 4, on the surface 18b, the first seal member 62 has an inner seal 62c provided around the coolant flow field 54 and an outer seal 62d provided outside the inner seal 62c. The inner seal 62a and the outer seal 62b are provided at positions corresponding to the inner seal 62c and the outer seal 62d, respectively.

The inner seal 62c is provided around the coolant flow field 54, the coolant supply passage 26a, and the coolant discharge passage 26b, and covers the back surface buffers 56a, 56b (see FIG. 4). The coolant supply passage 26a and the coolant discharge passage 26b are connected to the coolant flow field 54 through the connection channels 66a, 66b, respectively.

Next, operation of the fuel cell 10 will be described below.

Firstly, as shown in FIG. 1, in the fuel cell 10, an oxygen-containing gas is supplied to the oxygen-containing gas supply passage 22a, and a fuel gas such as a hydrogen-containing gas is supplied to the fuel gas supply passage 24a. Further, a coolant such as pure water or ethylene glycol is supplied to the coolant supply passage 26a. Thus, the oxygen-containing gas, the fuel gas, and the coolant are supplied in the direction indicated by the arrow A, to the power generation cells 12 stacked together in the direction indicated by the arrow A.

The oxygen-containing gas flows from the oxygen-containing gas supply passage 22a to the oxygen-containing gas flow field 44 of the second metal separator 20, and flows along the cathode 32 of the membrane electrode assembly 16 for inducing an electrochemical reaction at the cathode 32.

On the surface 20a of the second metal separator 20, the oxygen-containing gas flowing through the oxygen-containing gas supply passage 22a passes through spaces between the receivers 50a, and then, the oxygen-containing gas is supplied to the inlet buffer 46a. The oxygen-containing supplied to the inlet buffer 46a is dispersed in the direction indicated by the arrow B, and flows downwardly along the corrugated flow grooves 44a of the oxygen-containing gas flow field 44. The oxygen-containing gas is supplied to the cathode 32 of the membrane electrode assembly 16 for inducing an electrochemical reaction at the cathode 32.

As shown in FIGS. 1 and 3, on the surface 18b of the first metal separator 18, the fuel gas flows from the fuel gas supply passage 24a into the supply holes 42a to the surface 18a. The fuel gas passes through spaces between the receivers 40a, and then, the fuel gas is supplied into the inlet buffer 36a. The fuel gas is dispersed in the direction indicated by the arrow B in the inlet buffer 36a and flows downwardly along the corrugated flow grooves 34a of the fuel gas flow field 34. The fuel gas is supplied to the anode 30 of the membrane electrode assembly 16 for inducing an electrochemical reaction at the anode 30.

Thus, in each of the membrane electrode assemblies 16, the oxygen-containing gas supplied to the cathode 32, and the fuel gas supplied to the anode 30 are consumed in the electrochemical reactions at catalyst layers of the cathode 32 and the anode 30 for generating electricity (see FIG. 2).

The oxygen-containing gas consumed at the cathode 32 flows to the outlet buffer 46b connected to a lower portion of the oxygen-containing gas flow field 44. The oxygen-containing gas from the outlet buffer 46b passes through spaces between the receivers 50b, and the oxygen-containing gas is discharged into the oxygen-containing gas discharge passage 22b.

Likewise, as shown in FIGS. 1 and 3, the fuel gas consumed at the anode 30 flows to the outlet buffer 36b connected to a lower portion of the fuel gas flow field 34. The fuel gas passes through spaces between the receivers 40b. Then, the fuel gas flows through the discharge holes 42b to the surface 18b, and the fuel gas is discharged into the fuel gas discharge passage 24b.

Further, after the coolant flows from the coolant supply passage 26a into the coolant flow field 54 between the first and second metal separators 18, 20, the coolant flows in the horizontal direction indicated by the arrow B. After the coolant cools the membrane electrode assembly 16, the coolant is discharged into the coolant discharge passage 26b.

In the first embodiment, as shown in FIG. 2, the first metal separator 18 of one of the adjacent power generation cells 12 and the second metal separator 20 of the other of the adjacent power generation cells 12 are directly stacked together to form the coolant flow field 54. In the structure, the press lines 38a, 38b and the press lines 48a, 48b contact each other to limit the flow of the coolant into the back surface buffers 56a, 56b.

Thus, as shown in FIG. 4, it is possible to reliably prevent the coolant supplied from the coolant supply passage 26a to the coolant flow field 54 through the connection channels 66a from entering the back surface buffers 56a, 56b.

In the structure, the coolant flows reliably and suitably along the coolant flow field 54 without undesirably flowing through the back surface buffers 56a, 56b, and it is possible to suitably reduce the required flow rate of the coolant. Thus, the energy loss in the coolant pump (not shown) is reduced effectively, and improvement in the overall system efficiency in the fuel cell 10 is achieved easily.

Further, the press lines 38a, 48a form part of protrusions on the surface where the coolant flow field 54 is provided, and part of grooves on the surfaces where the fuel gas flow field 34 and the oxygen-containing gas flow field 44 are provided. Thus, the fuel gas and the oxygen-containing gas are distributed uniformly and reliably over the fuel gas flow field 34 and the oxygen-containing gas flow field 44, and improvement in the power generation performance is achieved advantageously.

Further, the coolant is distributed uniformly into the power generation area of the membrane electrode assembly 16. Thus, generation of local hot spots is prevented effectively, and in particular, the desired temperature in the solid polymer electrolyte membrane 28 is maintained advantageously.

Moreover, in the first embodiment, the gases flow in the fuel gas flow field 34 and the oxygen-containing gas flow field 44 in the direction of gravity indicated by the arrow C, and the coolant flows in the coolant flow field 54 in the horizontal direction indicated by the arrow B. Conversely, the gases may flow in the fuel gas flow field 34 and the oxygen-containing gas flow field 44 in the horizontal direction, and the coolant may flow in the coolant flow field 54 in the direction of gravity.

Figure 5:
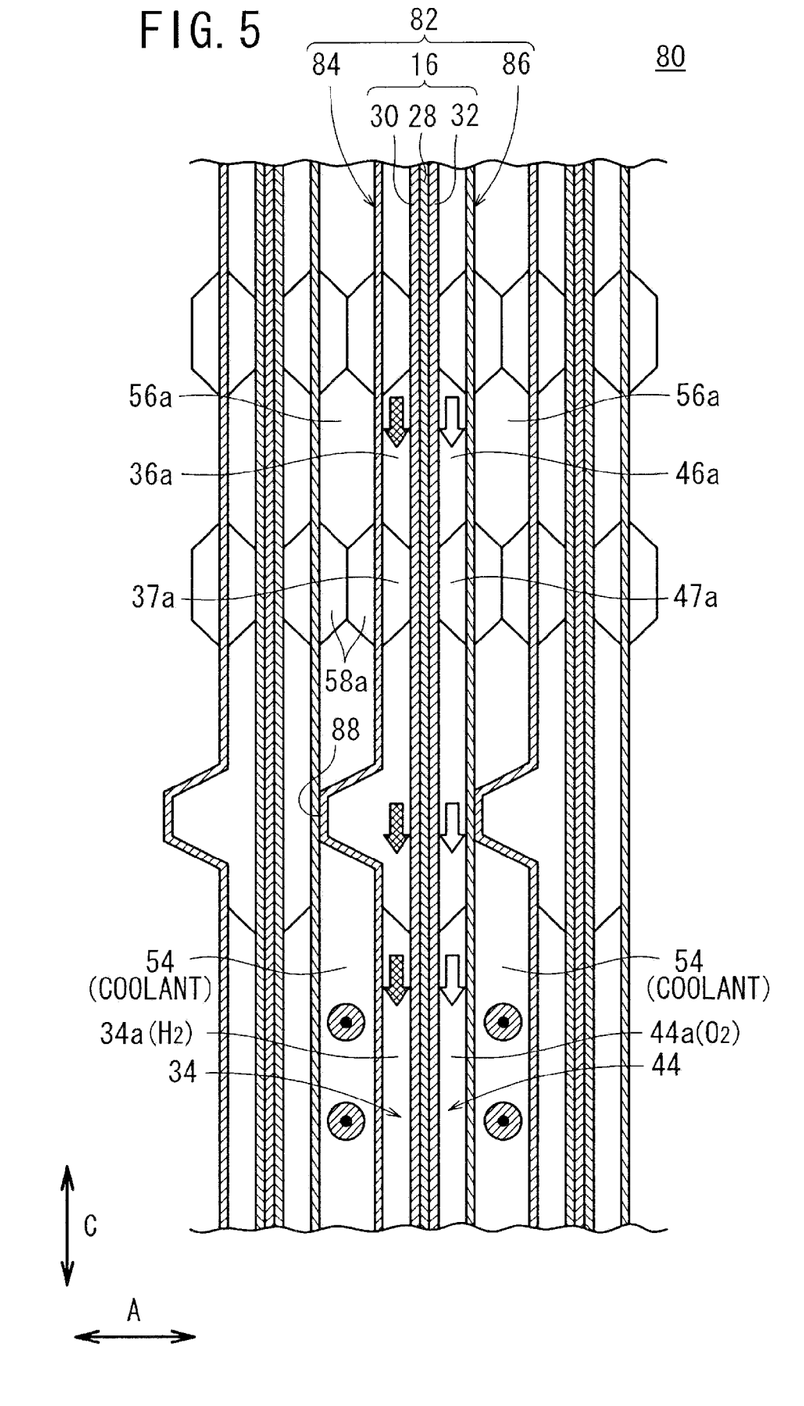
FIG. 5 is a cross sectional view showing main components of a fuel cell according to a second embodiment of the present invention.

FIG. 5 is a cross sectional view showing main components of a fuel cell 80 according to a second embodiment of the present invention. The constituent elements that are identical to those of the fuel cell 10 according to the first embodiment are labeled with the same reference numerals, and description thereof will be omitted. Further, also in third and fourth embodiments as descried later, the constituent elements that are identical to those of the fuel cell 10 according to the first embodiment are labeled with the same reference numerals, and description thereof will be omitted.

The fuel cell 80 is formed by stacking a plurality of power generation cells 82 in a direction indicated by an arrow A. The power generation cell 82 includes a membrane electrode assembly 16, and a first metal separator 84 and a second metal separator 86 sandwiching the membrane electrode assembly 16.

In the first metal separator 84, a press line (protrusion) 88 protruding toward the coolant flow field 54 is formed between the fuel gas flow field 34 and the inlet buffer 36a. The press line 88 is substantially twice as high as the above described press line 38a. The second metal separator has a flat surface without having the press line 48a.

In the second embodiment, the first metal separator 84 of one of the adjacent power generation cells 82 and the second metal separator 86 of the other of the adjacent power generation cells 82 are directly stacked together. In the structure, the press line 88 of the first metal separator 84 and the flat surface of the second metal separator 86 contact each other to limit the flow of the coolant into the back surface buffer 56a. Thus, the same advantages as in the case of the first embodiment are obtained.

Figure 6:
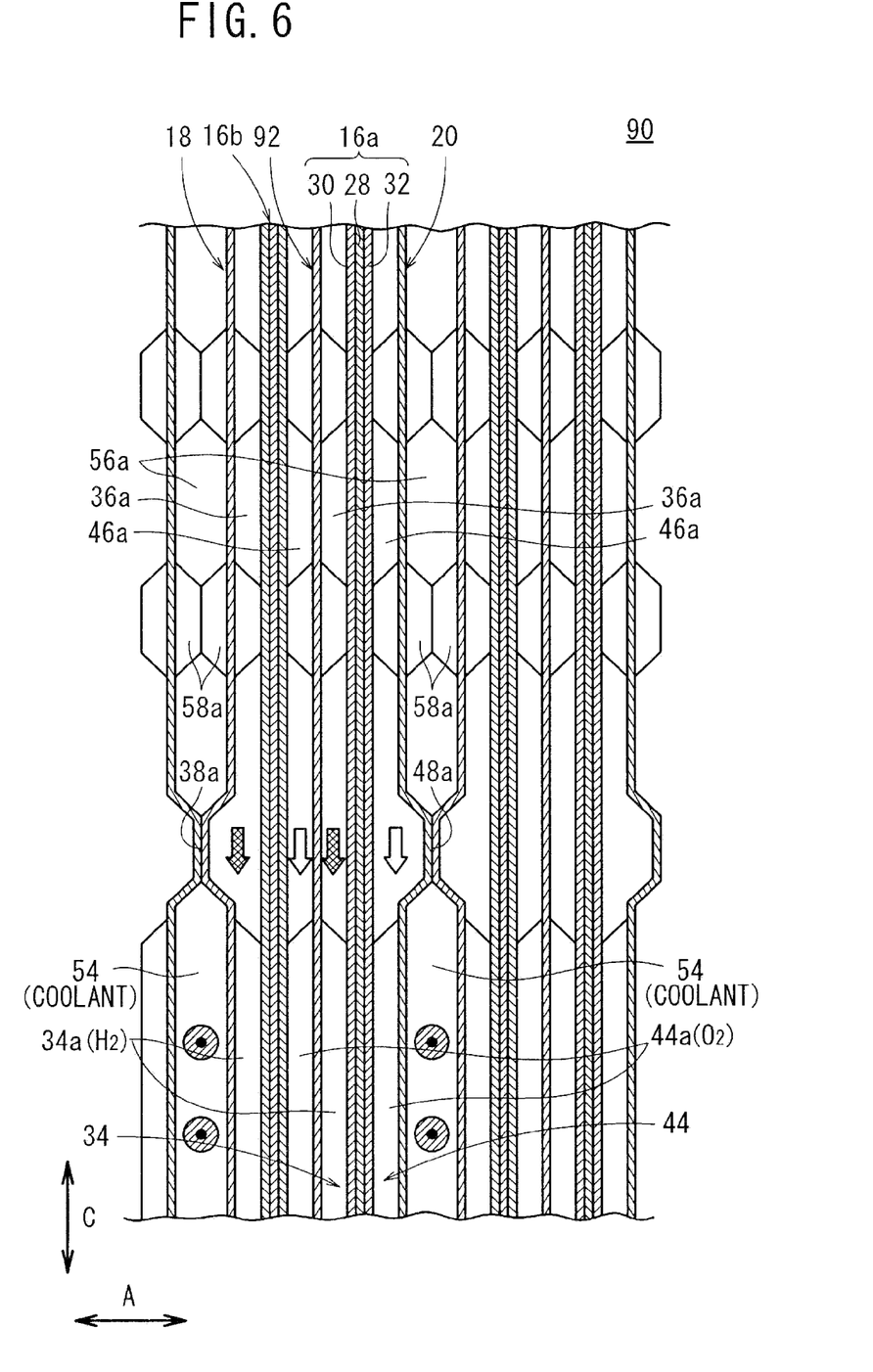
FIG. 6 is a cross sectional view showing main components of a fuel cell according to a third embodiment of the present invention.

FIG. 6 is a cross sectional view showing main components of a fuel cell 90 according to a third embodiment of the present invention.

The fuel cell 90 adopts so called skip cooling structure. The fuel cell 90 includes a first metal separator 18, a first membrane electrode assembly 16a, an intermediate metal separator 92, a second membrane electrode assembly 16b, and a second metal separator 20 stacked together in a direction indicated by an arrow A.

The intermediate metal separator 92 has a fuel gas flow field 34 on its surface facing the first membrane electrode assembly 16a and an oxygen-containing gas flow field 44 on its surface facing the second membrane electrode assembly 16b.

In the third embodiment, the first metal separator 18 and the second metal separator 20 contact each other to form the coolant flow field 54, and the press lines 38a, 48a contact each other to limit the flow of the coolant into the back surface buffer 56a. In the structure, the same advantages as in the cases of the first and second embodiments are obtained.

Figure 7:
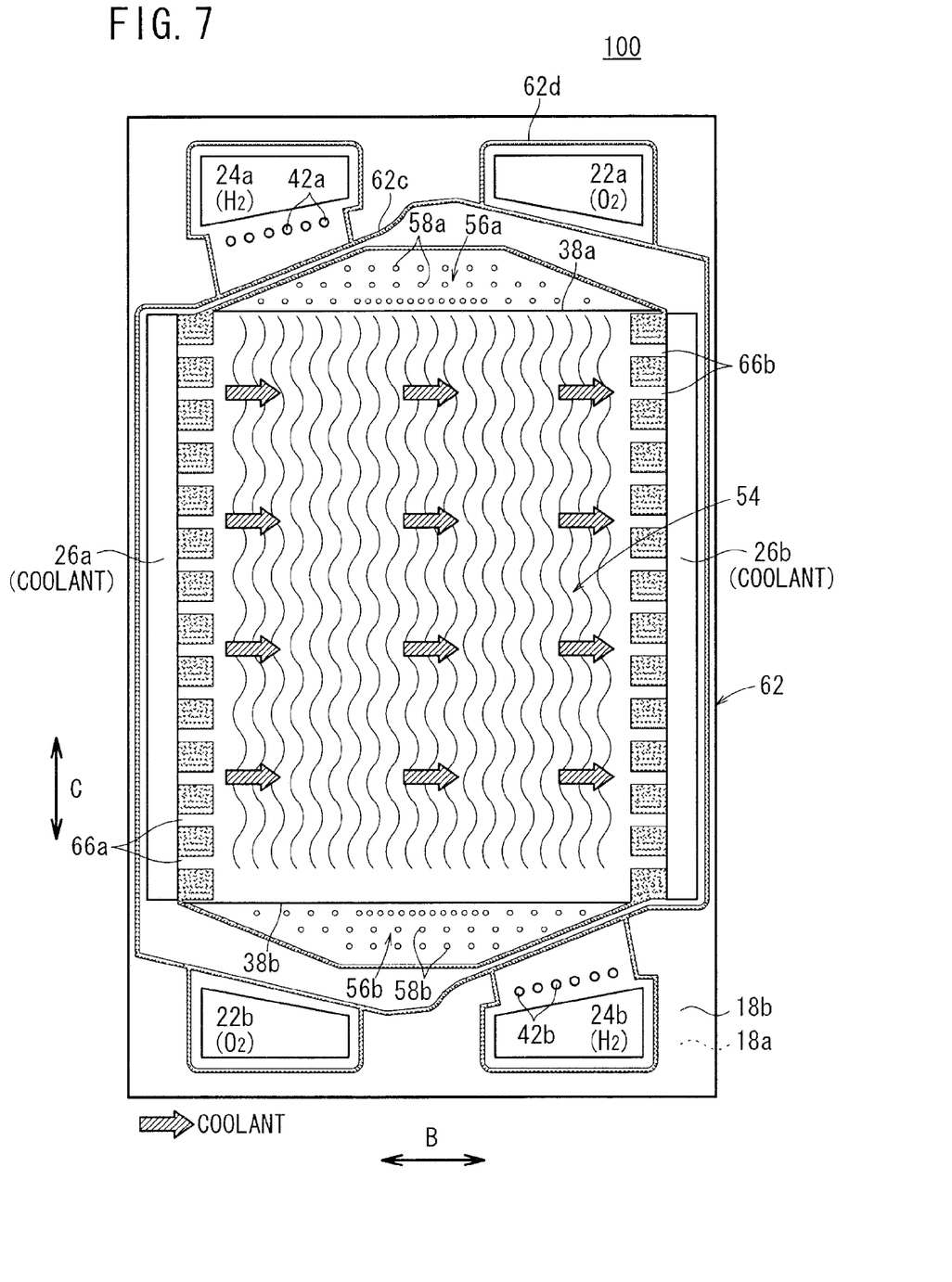
FIG. 7 is a front view showing a first metal separator of a fuel cell according to a fourth embodiment of the present invention.

FIG. 7 is a front view showing a first metal separator 100 of a fuel cell according to a fourth embodiment of the present invention.

A plurality of bosses 58a, 58b are provided in the back surface buffers 56a, 56b of the first metal separator 100 adjacent to the press lines 38a, 38b. The bosses 58a, 58b are provided, in particular, densely at central positions of the back surface buffers 56a, 56b. Though not shown, the second metal separator has the similar structure to the first metal separator 100.

In the fourth embodiment, the bosses 58a, 58b are densely provided adjacent to the press lines 38a, 38b, more preferably, locally at central positions of the back surface buffers 56a, 56b where the surface pressure tends to be dropped easily. In the structure, it is possible to limit the flow of the coolant into the back surface buffers 56a, 56b. Also, it is possible to reliably and suitably apply the tightening load to the entire fuel cell.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking a membrane electrode assembly and metal separators of corrugated plates in a stacking direction, said membrane electrode assembly including:
    a pair of electrodes, and an electrolyte membrane interposed between said electrodes,
    a reactant gas flow field being formed in said fuel cell for supplying a reactant gas along an electrode surface,
    a coolant flow field being formed in said fuel cell for supplying a coolant in a direction intersecting a flow direction of the reactant gas of said reactant gas flow field,
    a reactant gas passage and a coolant passage extending through said metal separators for allowing the reactant gas and the coolant to flow in the stacking direction, respectively, said metal separators each having a reactant gas buffer connecting said reactant gas passage and said reactant gas flow field on one side of the metal separators, the reactant gas buffer configured to enable uniform dispersion of the reactant gas in the reactant gas flow field, wherein at least one of said metal separators includes a protrusion formed from the metal of the metal separator, the protrusion protruding toward said coolant flow field located on an opposite side of the at least one of the metal separators from the side where a reactant gas flow field is located, the location of the protrusion on the metal separator corresponding to a location between said reactant gas flow field and said reactant gas buffer that are on the opposite side of the at least one of the metal separators, the protrusion limiting flow of the coolant into a back surface area of the metal separator that corresponds to the location of the reactant gas buffer on the other side of the metal separator.

2. A fuel cell according to claim 1, wherein said metal separators include a first metal separator of one of adjacent fuel cells and a second metal separator of the other of the adjacent fuel cells, and said first metal separator and said second metal separator have, respectively, a first protrusion and a second protrusion protruding toward said coolant flow field formed between said first metal separator and said second metal separator, said first protrusion and said second protrusion contact each other to limit flow of the coolant into said back surface area of the metal separator that corresponds to the location of the reactant gas buffer on the other side of the metal separator.

3. A fuel cell according to claim 1, wherein said protrusion comprises a press line.

4. A fuel cell according to claim 1, wherein a plurality of bosses are provided in said buffer, locally at central positions adjacent to said protrusion.

5. A fuel cell according to claim 1, wherein said reactant gas flow field comprises a plurality of fuel gas corrugated flow grooves and a plurality of oxygen-containing gas corrugated flow grooves; and a back surface of said fuel gas corrugated flow grooves and a back surface of said oxygen-containing gas corrugated flow grooves are overlapped with each other to form said coolant flow field.

* * * * *